(No Model.)
C. N. BROWN.
INKSTAND.
No. 539,343. Patented May 14, 1895.
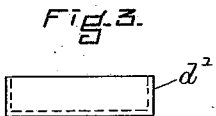
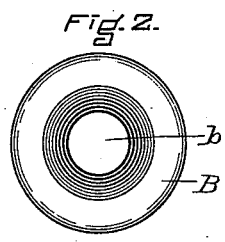
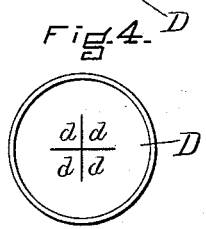
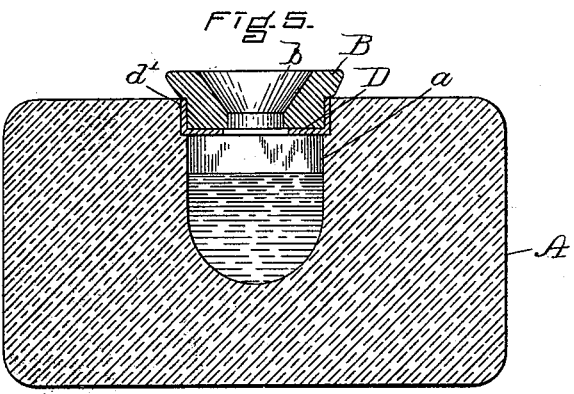
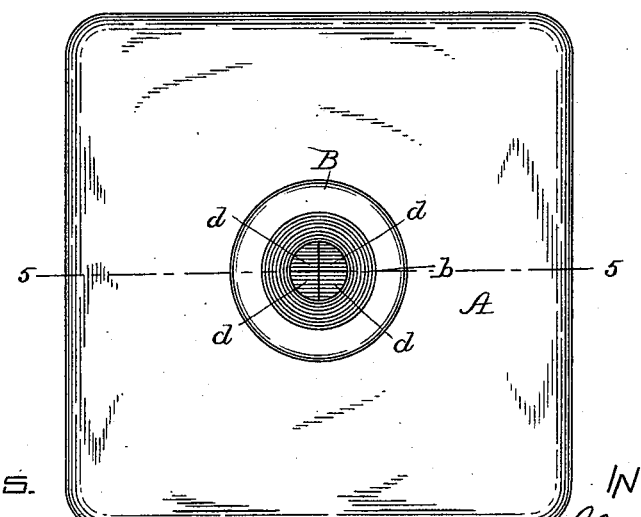
WITNESSES.
O. R. Mitchell.
John R. Snow.
INVENTOR.
Charles N. Brown
by his attorney,
J. E. Maymadier
THE NORRIS PETERS CO., PHOTO-LITHO., WASHINGTON, D. C.

UNITED STATES PATENT OFFICE.

CHARLES NOYES BROWN, OF BOSTON, MASSACHUSETTS.

INKSTAND.

SPECIFICATION forming part of Letters Patent No. 539,343, dated May 14, 1895.

Application filed January 21, 1895. Serial No. 535,594. (No model.)

*To all whom it may concern:*

Be it known that I, CHARLES NOYES BROWN, of Boston, Massachusetts, have invented an Improved Inkstand, of which the following is a specification, reference being had to the accompanying drawings, in which—

Figure 1 is an elevation of the stopper, showing the aperture $b$ in dotted lines. Fig. 2 is a plan of Fig. 1. Fig. 3 is an elevation of the diaphragm D. Fig. 4 is a plan of Fig. 3. Fig. 5 is a sectional elevation of my improved inkstand on line 5 5 of Fig. 6. Fig. 6 is a plan of Fig. 5.

My invention consists in a stopper for inkstands composed of a body of any suitable material with an aperture through it and a flat diaphragm of elastic material with intersecting slits held to the body by an elastic rim.

In the drawings A is the inkstand, and B D is the stopper fitting in the mouth of the inkwell against a shoulder $a$ within the inkwell.

D is the diaphragm of flexible material with an elastic rim $d'$. The diaphragm is cut by two slits intersecting one another near its middle. The rim $d^3$ is stretched about the body B, and between the inkstand A and the body B, when the stopper B D is in place; and the diaphragm is thus held in place across the bottom of the body B, the intersecting slits coming beneath the aperture $b$ in the body B, and over the ink in the well.

To obtain all and the best results from my invention, the sheet rubber from which the diaphragm is formed should be thick enough and stiff enough to cause the points $d\,d\,d\,d$ to remain approximately close together by reason of the stiffness of the rubber, without sagging down at their extremities, and this result may be accomplished either by using a comparatively thick sheet of soft rubber or a thinner sheet of harder rubber. The rubber that I use is about a thirty-second of an inch in thickness and of good quality.

It is obvious that several slits may be made in the rubber or one only will answer. Two intersecting slits, giving four points $d\,d\,d\,d$ give the best results.

The operation is as follows: The inkwell being supplied with ink the stopper composed of the diaphragm D and body B is inserted in the mouth of the inkwell, the rim $d'$ of diaphragm D being securely held between the walls of the inkwell and the body B. The pen being inserted in the aperture $b$ its point passes through the diaphragm D by depressing the points $d\,d\,d\,d$. As the pen is withdrawn the elastic points $d\,d\,d\,d$ of the diaphragm D rise, closing as soon as the pen is withdrawn. In case of an accidental upsetting of the inkstand the diaphragm D prevents the escape of the ink.

I am aware of the patent to Felt, No. 280,922, and disclaim all shown and described therein.

What I claim is—

In a stopper for inkwells the combination of body B having an aperture $b$ through it and a diaphragm D provided with intersecting slits forming points $d$ and having an extensible and resilient rim $d'$ to fit the lower end of the body B, substantially as described.

CHARLES NOYES BROWN.

Witnesses:
O. R. MITCHELL,
JOHN R. SNOW.